United States Patent [19]

Futagawa

[11] Patent Number: 4,626,064

[45] Date of Patent: Dec. 2, 1986

[54] OPTICAL RETRIEVING SYSTEM

[76] Inventor: Toshinobu Futagawa, 5-21-2-503, Higashigotanda, Shinagawa-ku, Tokyo, Japan

[21] Appl. No.: 574,683

[22] Filed: Jan. 27, 1984

[30] Foreign Application Priority Data

Feb. 10, 1983 [JP] Japan ............... 58-21156

[51] Int. Cl.⁴ ................................................. G02B 6/12
[52] U.S. Cl. ................................................ 350/96.10
[58] Field of Search ................ 350/96.10, 96.18; 355/1; 362/32

[56] References Cited

U.S. PATENT DOCUMENTS

| | | | |
|---|---|---|---|
| 3,544,191 | 12/1970 | Rottmann | 350/96.10 X |
| 3,545,838 | 12/1970 | Levin et al. | 350/96.10 |
| 3,584,779 | 6/1971 | Kessler | 350/96.18 X |
| 3,635,135 | 1/1972 | Ambraschka et al. | 350/96.10 X |
| 3,781,546 | 12/1973 | Christian et al. | 350/96.18 X |
| 4,483,585 | 11/1984 | Takami | 350/96.18 X |

FOREIGN PATENT DOCUMENTS 0046226 3/1982 Japan .................. 350/96.18

Primary Examiner—William L. Sikes
Assistant Examiner—Akm E. Ullah
Attorney, Agent, or Firm—Louis Orenbuch

[57] ABSTRACT

An optical retrieving system comprising a light source and a lens means for receiving a light from the light source, wherein the lens means is held stationary, the light source being movable, a flexible optical fiber means being provided between the movable light source and the stationary lens means for always maintaining the optical alignment between the light source and the lens means even during the movement of the light source.

3 Claims, 2 Drawing Figures

OPTICAL RETRIEVING SYSTEM

BACKGROUND OF THE INVENTION

The present invention relates to an optical retrieving system.

When information stored in a film (for example, a microfilm) is retrieved by an optical retrieving system comprising a light source and a lens assembly for receiving light from the light source, it is a great convenience to simultaneously shift or move both of the light source and the lens in the same direction by the same amount to extend the range of possible retrieval. However, in this case, it is very difficult to maintain an accurate optical alignment between the light source and the lens during the movement thereof; misalignment often results in inaccurate retrieval. Another drawback arising from the movement of the lens is that it is necessary for an operator to perform the frequent focusing of the lens with respect to an output portion (for example, an projector) of the optical retrieving system.

SUMMARY OF THE INVENTION

An object of the present invention is to provide an optical retrieving system eliminating the above-mentioned drawbacks. In order to achieve this object, according to a preferred embodiment of the present invention, the optical retrieving system comprises a light source and a lens assembly for receiving light from the light source and is characterized in that the lens is held stationary, the light source being movable, a flexible optical fiber means being provided between the movable light source and the stationary lens for always maintaining the optical alignment between the light source and the lens even during the movement of the light source. With this characteristic, frequent focusing of the lens with respect to the output portion of the system is eliminated.

DETAILED DESCRIPTION OF THE PREFERRED EMBODIMENTS

Figure 1:
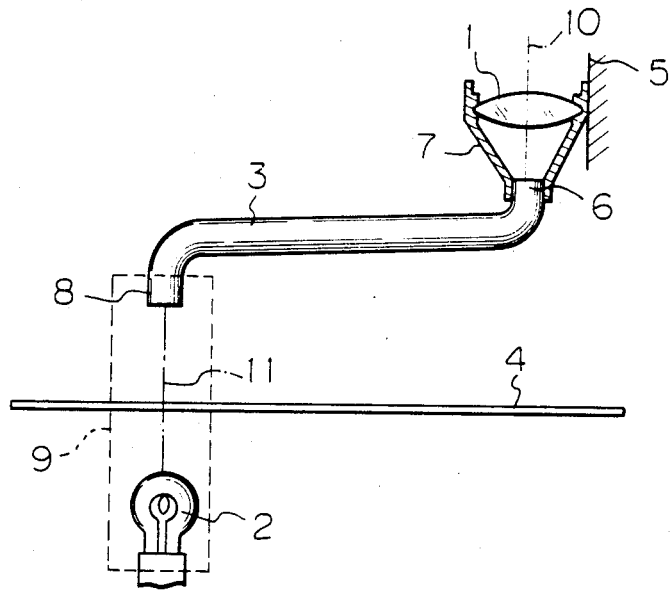
FIG. 1 is a schematic elevational view showing the principle of an optical retrieving system according to the present invention; and, FIG. 2 is a sectional view taken along the line II—II of FIG. 1, showing an embodiment of a mechanism for simultaneously shifting the light source and an end portion of an optical fiber means.
Figure 2:
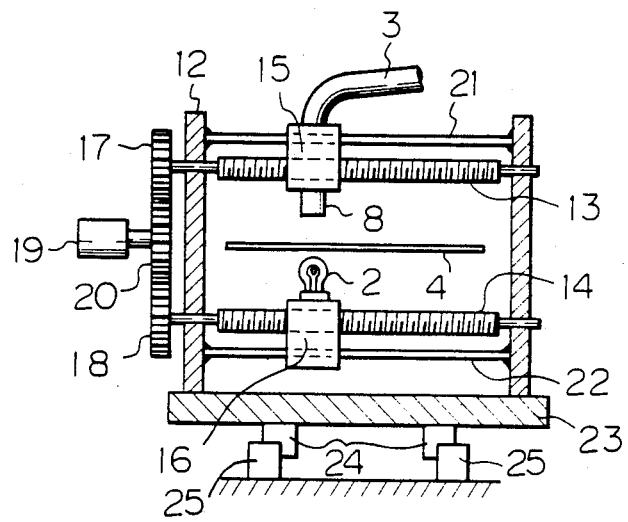

The present invention will be described in detail with reference to the drawings showing an embodiment of the optical retrieving system according to the present invention. As shown in FIGS. 1 and 2, the optical retrieving system according to the invention comprises a stationary lens assembly 1 suitably fixed to a frame 5 of the system, a light source 2 arranged on one side of a film 4 and movable along the film 4, and a flexible optical fiber means 3 positioned between the lens assembly 1 and the light source 2. Recorded on the film 4 is information that is to be read by the optical system. One end 6 of the optical fiber 3 is fixed to the lens assembly 1 by means of an appropriate fixing member 7 in such a way that the fiber end 6 is always optically aligned with the lens 1, as shown by a center line 10. The other end 8 of the optical fiber 3 faces to the light source 2 with the interposition of the film 4 in such a way that the fiber end 8 is always optically aligned with the light source 2, as shown by center line 11. Particularly, the fiber end 8 is arranged to move together with the light source 2 in the same direction by the same amount. To this end, the fiber end 8 is linked with the light source 2 by means of a mechanism 9 which simultaneously shifts the light source 2 and the fiber end 8. The mechanism 9 is shown schematically in FIG. 1 by a dotted line.

The mechanism 9 for simultaneously shifting the light source 2 and the fiber end 8 in the same direction by the same amount may be of any known type; an example of the mechanism 9 is shown in FIG. 2. In FIG. 2, the mechanism 9 comprises a pair of upper and lower lead screws 13 and 14 having the same pitch and rotatably mounted on side plates 12, the lead screws extending parallel to each other and also aligned with each other in a vertical direction, a pair of upper and lower carriages 15 and 16 each threaded on the corresponding lead screw and movable along it, the carriages also being aligned with each other in a vertical direction, a pair of gears 17 and 18 of the same type each fixed to one end of the corresponding lead screw 13, 14 respectively, a driving gear 20 meshed with the gears 17, 18 and driven by a reversible stepping motor 19, and guide bars 21 and 22 for the movable carriages 15, 16. The fiber end 8 is mounted on the upper carriage 15, while the light source 2 is mounted on the lower carriage 16. The fiber end 8 and the light source 2 are so arranged that they are always optically aligned with each other. With this arrangement, when the driving gear 20 is rotated by the motor 19 in one direction, the lead screws 13 and 14 will also be rotated in the same direction at the same speed through the medium of the gears 17 and 18, and thus, the carriages 15 and 16 which are threaded on the lead screws will be simultaneously shifted along the respective guide bars 21, 22 in either direction transversely of the film 4 (i.e., to the right or left in FIG. 2) by the same amount. Accordingly, the light source 2 and the fiber end 8 are shifted in the transverse direction of the film 4, with maintaining the optical alignment between the light source 2 and the fiber end 8. Since the optical fiber 3 is flexible, the movement of the carriages is not restrained by the fiber.

The mechanism 9 further includes means for shifting the light source 2 and the fiber end 8 in the longitudinal direction of the film 4. Said means comprises, for example, wheels or slides 24 mounted on a base frame or chassis 23 to which the side plates 12 are fixed, and longitudinal guide rails 25 engaged by the respective slides 24 and extending in the longitudinal direction of the film 4. With this arrangement, when the chassis 23 is moved along the guide rails 25 by sliding the slides 24 on the corresponding rails, the light source 2 and the fiber end 8 which are mounted on the side plates 12 fixed to the chassis will be shifted in the longitudinal direction of the film 4, while maintaining the optical alignment between the light source and the fiber end 8. In this way, the light source 2 and the fiber end 8 which are always optically aligned with each other can be shifted in a desired direction by the same amount.

It should be noted that any other shifting means can be used in place of the illustrated mechanism 9. For example, the upper and lower carriages 15 and 16 may be rigidly interconnected and one of these carriages may be shifted by means of a lead screw or a wire drive. Further, the upper and lower carriages may be simultaneously shifted by an appropriate link work, pulley-belt drive, wire drive or the like. It should also be noted that the means (23, 24, 25) for shifting the light source and the fiber end 8 in the longitudinal direction of the film is not limited to the illustrated embodiment. For example, the chassis 23 and the side plates 12 on which the light source 2 and the fiber end 8 are mounted may be moved in the longitudinal direction by means of an appropriate rack and pinion drive.

In operation, due to an inherent characteristic of the optical fiber, the light arrived at the fiber end 8 through the film 4 from the light source 2 enters into the optical fiber 3 and is transmitted to the other fiber end 6; the light outcoming from the fiber end 6 then passes through the aligned lens 1 and focuses into an image (corresponding to that recorded on the film) onto the output portion such as a projector appropriately adjusted (not shown). In this way, the information recorded on the film 4 is retrieved by the optical retrieving system according to the present invention. If it is necessary to retrieve the other portion of the film 4, the light source 2 and the fiber end 8 can be simultaneously shifted by the shifting mechanism 9 so that a desired film portion is positioned between the light source 2 and the fiber end 8.

The present invention eliminates the above-mentioned drawbacks of the prior art. In fact, in the optical retrieving system according to the present invention, frequent focusing of the lens is not needed after the lens has once been focused, since the lens assembly 1 is stationary and only the light source 2 and the fiber end 8 are shifted for retrieving the information on the film. Further, the optical retrieving system according to the present invention can retrieve over a wide area of the film with only a single light source. Particularly, the optical retrieving system according to the present invention is effective to retrieve the information recorded on the multi-track microfilms.

This application is, therefore, intended to cover any variations, uses, or adaptions of the invention following the general principles thereof and including such departures from the present disclosure as come within known or customary practice in the art to which this invention pertains and fall within the limits of the appended claims.

What is claimed is:

1. In an optical system for reading information recorded on a translucent film, where the system is of the kind having
    (i) a source of light for illuminating information recorded on the film, and
    (ii) optical means having a lens for reading information from the film, the improvement wherein the light source is movable and wherein the optical means further includes
    (a) a flexible optical fiber having one end situated to emit light onto the lens, and
    (b) means holding said one end of the flexible optical fiber aligned with the optical axis of the lens, said means holding the lens and said aligned one end of the flexible optical fiber stationary relative to the movable light source, and wherein the improvement further comprises
    carriage means having the light source and the other end of the flexible optical fiber mounted thereon in a manner enabling the film to be interposed between the light source and said other end of the flexible optical fiber with the carriage means movable across the film, said other end of the flexible optical fiber being situated to intercept light passing through a localized area of the film illuminated by the light source and transmit that light along the flexible optical fiber to said one end whereby the film can be scanned to read out the recorded information through the stationery lens.

2. In an optical information reading system of the kind having
    (i) a source of artificial light for illuminating information recorded on a medium, and
    (ii) a lens for receiving light containing information read from the illuminated medium, the improvement comprising
    (a) a first carriage having the light source carried thereon,
    (b) means for holding the lens stationary relative to the light source,
    (c) a flexible optical fiber having one end optically aligned to emit light onto the stationary lens and having its other end situated to receive information containing light from the illuminated medium,
    (d) a second carriage having said other end of the flexible optical fiber carried thereon, and
    (e) drive means for causing the first and second carriages to move simultaneously and maintain a fixed optical alignment between the light source and said other end of the flexible optical fiber.

3. The improvement according to claim 2, wherein the drive means comprises
    (1) a first shaft engaged with the first carriage,
    (2) a second shaft engaged with the second carriage, the second shaft being parallel to the first shaft, and
    (3) means for causing simultaneous rotation of said first and second shafts whereby the carriages are driven in the same direction and at the same rate of movement.

* * * * *